(12) United States Patent
Cao

(10) Patent No.: US 8,780,892 B2
(45) Date of Patent: Jul. 15, 2014

(54) METHOD AND DEVICE FOR PROCESSING MULTIMEDIA MESSAGING SERVICE NOTIFICATION MESSAGE AND MULTIMEDIA MESSAGING SERVICE RECEIVING SYSTEM

(75) Inventor: Gang Cao, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 320 days.

(21) Appl. No.: 13/056,640

(22) PCT Filed: Dec. 30, 2008

(86) PCT No.: PCT/CN2008/073855
§ 371 (c)(1),
(2), (4) Date: Jan. 28, 2011

(87) PCT Pub. No.: WO2010/012145
PCT Pub. Date: Feb. 4, 2010

(65) Prior Publication Data
US 2011/0176539 A1    Jul. 21, 2011

(30) Foreign Application Priority Data

Jul. 30, 2008   (CN) .......................... 2008 1 0129987

(51) Int. Cl.
*H04L 12/66* (2006.01)
*H04L 12/58* (2006.01)

(52) U.S. Cl.
CPC ............... *H04L 51/24* (2013.01); *H04L 51/18* (2013.01); *H04L 12/587* (2013.01)
USPC ........... 370/352; 370/356; 370/328; 370/329; 709/204; 709/206

(58) Field of Classification Search
USPC .......................... 370/328, 329, 338, 352, 356; 455/412.2, 412, 558, 456.1, 466, 550; 710/57; 709/203–204, 206–207, 227, 709/231
See application file for complete search history.

(56) References Cited

U.S. PATENT DOCUMENTS

2004/0185832 A1* 9/2004 Prenzel et al. ............. 455/412.1
2007/0112918 A1   5/2007 Berstis
(Continued)

FOREIGN PATENT DOCUMENTS

CN    1367432 A    9/2002
CN    1976333      6/2007
(Continued)

OTHER PUBLICATIONS

International Search Report, Application No. PCT/CN2008/073855, dated Mar. 20, 2009.
Examination Report in Chinese Patent Application No. 2011090800564550 in 6 pages.

*Primary Examiner* — Charles C Jiang
*Assistant Examiner* — Mohamed Kamara
(74) *Attorney, Agent, or Firm* — Knobbe, Martens, Olson & Bear, LLP

(57) ABSTRACT

A method and a device for processing a multimedia messaging service notification message and a multimedia messaging service receiving system are provided. The method for processing a multimedia messaging service notification message includes: receiving the multimedia messaging service notification message, and adding the multimedia messaging service notification message into a preset processing queue; setting a processing identifier which is used for indicating whether there is a circuit switch domain/a packet switch domain service being processed currently; judging whether there is a circuit switch domain/a packet switch domain service being processed currently according to the processing identifier, wherein if YES, it maintains the multimedia messaging service notification message in the processing queue for the purpose of being processed, and if NO, it reads a prior multimedia messaging service notification message from the processing queue for processing.

10 Claims, 4 Drawing Sheets

(56) References Cited

U.S. PATENT DOCUMENTS

| | | |
|---|---|---|
| 2008/0026762 A1 | 1/2008 | Lee |
| 2008/0167005 A1* | 7/2008 | Gilzean et al. ............. 455/412.2 |
| 2008/0172471 A1 | 7/2008 | Berstis |
| 2008/0220745 A1* | 9/2008 | Chang ........................ 455/412.2 |
| 2008/0274744 A1* | 11/2008 | Naqvi ........................... 455/445 |
| 2008/0313368 A1* | 12/2008 | Kuo et al. ........................ 710/57 |
| 2009/0185528 A1* | 7/2009 | Sambhwani et al. ......... 370/329 |

FOREIGN PATENT DOCUMENTS

| | | |
|---|---|---|
| CN | 101119593 | 2/2008 |
| KR | 20040031383 | 4/2004 |
| KR | 20050083365 | 8/2005 |

\* cited by examiner

METHOD AND DEVICE FOR PROCESSING MULTIMEDIA MESSAGING SERVICE NOTIFICATION MESSAGE AND MULTIMEDIA MESSAGING SERVICE RECEIVING SYSTEM

CROSS-REFERENCE TO RELATED APPLICATIONS

This application is the U.S. National Phase application under 35 U.S.C. §371 of International Application PCT/CN2008/073855 filed Dec. 30, 2008, which claims priority to Chinese Application 200810129987.1 filed Jul. 30, 2008. The entirety of each of these applications is hereby incorporated by reference.

FIELD OF THE INVENTION

The present invention relates to communication field, and specifically, to a method and a device for processing a multimedia messaging service notification message and a multimedia messaging service receiving system.

BACKGROUND OF THE INVENTION

Multimedia Messaging Service (referred to as MMS) is a short message service developed by mobile operators, which performs multimedia transmission with Wireless Application Protocol (referred to as WAP) as a carrier. The MMS service has the characteristics of supporting multimedia functions and being capable of transmitting content and information with comprehensive functions. The information includes information of various multimedia formats such as text, image, sound, and video.

The MMS service can realize instant multimedia information transmission of mobile phone end-to-end, mobile phone terminal-to-Internet or Internet-to-mobile phone terminal. Compared with the existing ordinary short messages, in addition to basic text information, the MMS is also configured with abundant multimedia contents such as color images, sound, animation, vibration, video and etc. Moreover, the MMS can be further configured with application contents such as news, cartoons, greeting cards, animated games and etc.

In the current market, mobile phone terminals of the medium end and high end used by most users can support the MMS service, for example, they can be configured with MMS application programs. In the MMS applications of mobile phone terminals, the receiving and transmitting modules of the MMS applications are very important and also very complicated, and the complexity is more prominent especially for MMS receiving process.

Currently, there are generally two receiving modes for the MMS: one is manual receiving (or known as delay receiving), and the other is automatic receiving (or known as immediate receiving), wherein the manual receiving indicates that, after receiving a notification message from the MMS center, if detecting that the MMS receiving setting on the mobile phone terminal is the delay receiving, the mobile phone terminal notifies the user of the receipt of the notification message, which requires the user to get the MMS message from the MMS center by operating the downloading function of the notification message; and the automatic receiving indicates that, after receiving the notification message from the MMS center, if detecting that the MMS receiving setting on the mobile phone terminal is the immediate receiving, the mobile phone terminal does not need to notify the user of the receipt of the notification message but directly obtains the MMS message from the MMS center through the notification message, and then, notifies the user of the receipt of a new MMS message.

In mobile communication specifications, the MMS default receiving setting of the mobile phone terminal is immediate receiving. Thus, at present, what is used by most users is MMS automatic receiving mode. However, in the existing medium end and high end mobile phones, especially in smart mobile phones in which software and service functions are relatively complicated, the following technical problems exist in the conventional MMS receiving methods, during the process of the system (viz. mobile phone terminal) receiving MMS:

(1) if the terminal user is currently using CS (Circuit Switch) domain module (for example, voice calls), the CS domain and PS (Packet Switch) domain can not coexist in some cases, which will therefore cause failure in MMS downloading or failure in the connection of a voice call;

(2) if the terminal user is currently using other PS domain module (such as web browser, JAVA, Fetion, and stream media), there exist the case of network dial-up conflict, which will therefore cause service interruption of the current operation;

(3) if the terminal user is currently using local modules (such as media players, cameras, and video cameras) with high memory consumption, the MMS application modules called by the conventional automatic receiving method per se also consume much memory, which will therefore likely cause a memory leak, causing a system crash;

(4) if the terminal successively receives a number of MMS messages, the receiving process continuously occupies a large amount of system CPU (Central Processing Unit) resource, which will therefore cause the occurrence of false system crash in the interface of the mobile phone terminal.

Thus, in the high end smart mobile phones in which software and service functions are relatively complicated, the technical problems of MMS reception shall be well addressed, especially concurrent problems caused by MMS reception and other services.

SUMMARY OF THE INVENTION

The present invention is proposed in view of the urgent need for handling the technical problem of MMS reception, especially concurrent problems caused by MMS reception and other services, in the high grade smart mobile phones in which software and service functions are complicated. Thus, the present invention aims to provide a method and a device for processing a MMS notification message and a multimedia messaging service receiving system, to solve at least one of the above problems.

In order to achieve the above object, according to one aspect of the present invention, a method for processing a multimedia messaging service notification message is provided.

The method for processing a multimedia messaging service notification message according to the present invention comprises: receiving the multimedia messaging service notification message, and adding the multimedia messaging service notification message into a preset processing queue; setting a processing identifier which is configured for indicating whether there is a circuit switch domain/a packet switch domain service being processed currently; judging whether there is a circuit switch domain/a packet switch domain service being processed currently according to the processing identifier, wherein if the judging result is YES, it maintains the multimedia messaging service notification message in the processing queue to wait for processing, and if the judging result is NO, it reads a prior multimedia messaging service notification message from the processing queue for processing.

Preferably, the method further comprises: presetting a timer for cyclically timing.

Preferably, before judging whether there is a circuit switch domain/a packet switch domain service being processed currently according to the processing identifier, the method further comprises: judging whether the processing queue is empty when the timer expires; and performing the operation of judging whether there is a circuit switch domain/a packet switch domain service being processed currently according to the processing identifier, in the case that the judging result is NO.

Preferably, the processing identifier is set in a shared memory.

Preferably, if the judging result is NO, the method further comprises: setting the processing identifier as indicating that there is a circuit switch domain/a packet switch domain service being processed currently.

In order to achieve the above object, according to another aspect of the present invention, a device for processing a multimedia messaging service notification message is provided.

The device for processing a multimedia messaging service notification message according to the present invention comprises: a receiving sub-module, adapted to receive the multimedia messaging service notification message; a queue maintaining sub-module, adapted to preset a processing queue, and add the multimedia messaging service notification message into the processing queue; a setting sub-module, adapted to set a processing identifier which is configured for indicating whether there is a circuit switch domain/a packet switch domain service being processed currently; a first judging sub-module, adapted to judge whether there is a circuit switch domain/a packet switch domain service being processed currently according to the processing identifier; and a processing sub-module, adapted to read a prior multimedia messaging service notification message from the processing queue for processing.

Preferably, the device further comprises: a timer, adapted for timing cyclically; and a second judging sub-module, adapted to judge whether the processing queue is empty.

Preferably, the second judging sub-module judges whether the processing queue is empty when the timer expires; and in the case that the second judging sub-module has the judging result of NO, the first judging sub-module judges whether there is a circuit switch domain/a packet switch domain service being processed currently according to the processing identifier.

Preferably, the setting sub-module is adapted to set the processing identifier as indicating that there is a circuit switch domain/a packet switch domain service being processed currently, in the case that the first judging sub-module has the judging result of NO; and the processing sub-module is adapted to read a prior multimedia messaging service notification message from the processing queue for processing, in the case that the first judging sub-module has the judging result of NO.

In order to achieve the above object, according to another aspect of the present invention, a multimedia messaging service receiving system is provided.

The multimedia messaging service receiving system according to the present invention comprises: a multimedia messaging service receiving module, which is bound with a main application module of a mobile terminal, adapted to implement interception of a multimedia messaging service notification message and automatic downloading of the multimedia messaging service; and a multimedia messaging service application module, adapted to transmit, manual download, and manage the multimedia messaging service, wherein, the multimedia messaging service receiving module particularly comprises: a receiving sub-module, adapted to receive the multimedia messaging service notification message; a queue maintaining sub-module, adapted to preset a processing queue, and add the multimedia messaging service notification message into the processing queue; a setting sub-module, adapted to set a processing identifier which is configured for indicating whether there is a circuit switch domain/a packet switch domain service being processed currently; a first judging sub-module, adapted to judge whether there is a circuit switch domain/a packet switch domain service being processed currently according to the processing identifier; and a processing sub-module, adapted to read a prior multimedia messaging service notification message from the processing queue for processing, and notify the processing results to the multimedia messaging service application module.

By means of at least one of the above technical solutions, through the present invention, an architecture which optimizes the MMS applications is used, a shared memory is used to set the CS domain or PS domain indication so as to avoid concurrence of multiple services, and technologies such as a notification message queue and a timer management mechanism are introduced to optimize MMS receiving flow at the mobile phone terminal, which can enhance the overall performance of MMS service of the terminal, and improve the experience of the users.

BRIEF DESCRIPTION OF THE
ACCOMPANYING DRAWINGS

The drawings herein are used to provide further understanding of the present invention, constituting a part of the specification. The exemplary embodiments of the present invention and the description thereof are used to explain the present invention without unduly limiting the present invention. In the accompanying drawings.

DETAILED DESCRIPTION OF THE PREFERRED
EMBODIMENTS

Brief Description on Functions

The embodiment of the present invention provides a method and a device for processing an MMS notification message and an MMS receiving system. In the technical solution provided in the embodiments of the present invention, an architecture which optimizes the MMS applications is used, the shared memory is used to set the CS domain or PS domain indication so as to avoid concurrence of multiple services, and technologies such as a notification message queue and a timer management mechanism are introduced to optimize MMS receiving flow at the mobile phone terminal, which can enhance success rate of MMS automatic receiving.

The present invention is described in detail with reference to the drawings and the embodiments as follows. It shall be explained that the embodiments of the present application and the features of the embodiments can be combined with each other if there is no conflict.

Device Embodiments

Figure 1:
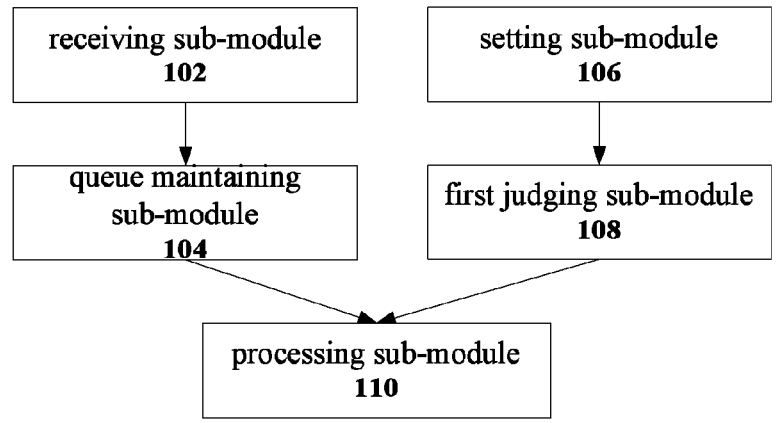
FIG. 1 is a structural block diagram of a device for processing an MMS notification message according to an embodiment of the present invention.

FIG. 1 is a structural block diagram of a device for processing an MMS notification message according to an embodiment of the present invention. As shown in FIG. 1, the device specifically comprises: a receiving sub-module 102, a queue maintaining sub-module 104, a setting sub-module 106, a first judging sub-module 108, and a processing sub-module 110. The structure of the device is described in detail as follows:

the receiving sub-module 102 is used for receiving an MMS notification message;

the queue maintaining sub-module 104 is connected to the receiving sub-module 102 for presetting a processing queue, and adding the MMS notification message into the processing queue;

the setting sub-module 106 is used for setting a processing identifier which is used for indicating whether there is a CS domain/a PS domain service being processed currently;

the first judging sub-module 108 is connected to the setting sub-module 106 for judging whether there is a CS domain/a PS domain service being processed currently, according to the processing identifier;

the processing sub-module 110 is connected to the first judging sub-module 108 and the queue maintaining sub-module 104, for reading a prior multimedia messaging service notification message from the processing queue, for processing.

In the above, the setting sub-module 106 is used for setting the processing identifier as indicating that there is a CS domain/a PS domain service being processed currently, in the case that the first judging sub-module 108 has the judging result of NO; and the processing sub-module 110 is used for reading, for processing, the prior MMS notification message from the processing queue, in the case that the first judging sub-module 108 has the judging result of NO.

Preferably, the receiving sub-module 102 further comprises: a timer (not shown in the figures) for cyclically timing; and a second judging sub-module (not shown in the figures) for judging whether the processing queue is empty.

Specifically, the second judging sub-module judges whether the processing queue is empty when the timer expires; and in the case that the second judging sub-module has the judging result of NO, the first judging sub-module 108 judges whether there is a CS domain/a PS domain service being processed currently according to the processing identifier.

Through the present embodiment, the shared memory is used to set the CS domain or the PS domain indication so as to avoid concurrence of multiple services, and a notification message queue and a timer management mechanism are introduced to greatly optimize the processing flow of the MMS notification message, which enhances the overall performance of the MMS service of the terminal.

System Embodiment

Figure 2:
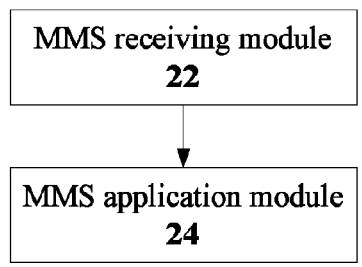
FIG. 2 is a structural block diagram of an MMS receiving system according to an embodiment of the present invention.

According to an embodiment of the present invention, an MMS receiving system is provided. FIG. 2 is a structural block diagram of an MMS receiving system according to an embodiment of the present invention. As shown in FIG. 2, the system comprises an MMS receiving module 22 and an MMS application module 24. The structure of the system is described in detail as follows:

the MMS receiving module 22 is bound with the main application module (or master server) of a mobile terminal for implementing interception of the MMS notification message and automatic downloading of the MMS;

the MMS application module 24 is connected to the MMS receiving module 22 for transmission, manually downloading, and managing the MMS; and the MMS application module 24 is also used for receiving the processing results after the MMS receiving module 22 processes the MMS notification message.

wherein, the MMS receiving module 22 specifically comprises: a receiving sub-module for receiving a multimedia messaging service notification message; a queue maintaining sub-module for presetting a processing queue and adding the multimedia messaging service notification message into the processing queue; a setting sub-module for setting a processing identifier which is used for indicating whether there is a circuit switch domain/a packet switch domain service being processed currently; a first judging sub-module for judging whether there is a circuit switch domain/a packet switch domain service being processed currently according to the processing identifier; and a processing sub-module for reading a prior multimedia messaging service notification message from the processing queue for processing, and notifying the processing results to the multimedia messaging service application module.

That is, the MMS receiving module 22 processes the MMS notification message, and notifies the processing results to the MMS application module 24. Specifically, the MMS receiving module 22 carries out MMS downloading according to the MMS notification message notifies the MMS application module 24 of the receipt of a new MMS message, in the case that the downloading succeeds, and notifies the MMS application module 24 of the receipt of a new MMS notification message, in the case that the downloading fails.

Through the present embodiment, the architecture of MMS application is optimized, the conventional MMS application is divided into two parts, one is the MMS receiving module which has relatively simple functions, occupies small system memory, and resides in the system memory together with the main application, and the other one is the MMS application module which has relatively complicated functions, occupies large system memory, and is usually loaded into the memory by selecting a desktop management module of the main application of the system only when the user needs it. With the above architecture, when MMS automatic downloading is carried out at the terminal, it is not necessary to start the whole application modules of the existing MMS for downloading, which can reduce system memory consumption, avoid system crash caused by memory leak due to the concurrent use of the applications of high memory consumption by other users; and can accelerate the processing of MMS automatic receiving as the MMS receiving sub-module resides in the memory, and can also accelerate the starting of the MMS applications per se, when the user opens the MMS applications.

Figure 3:
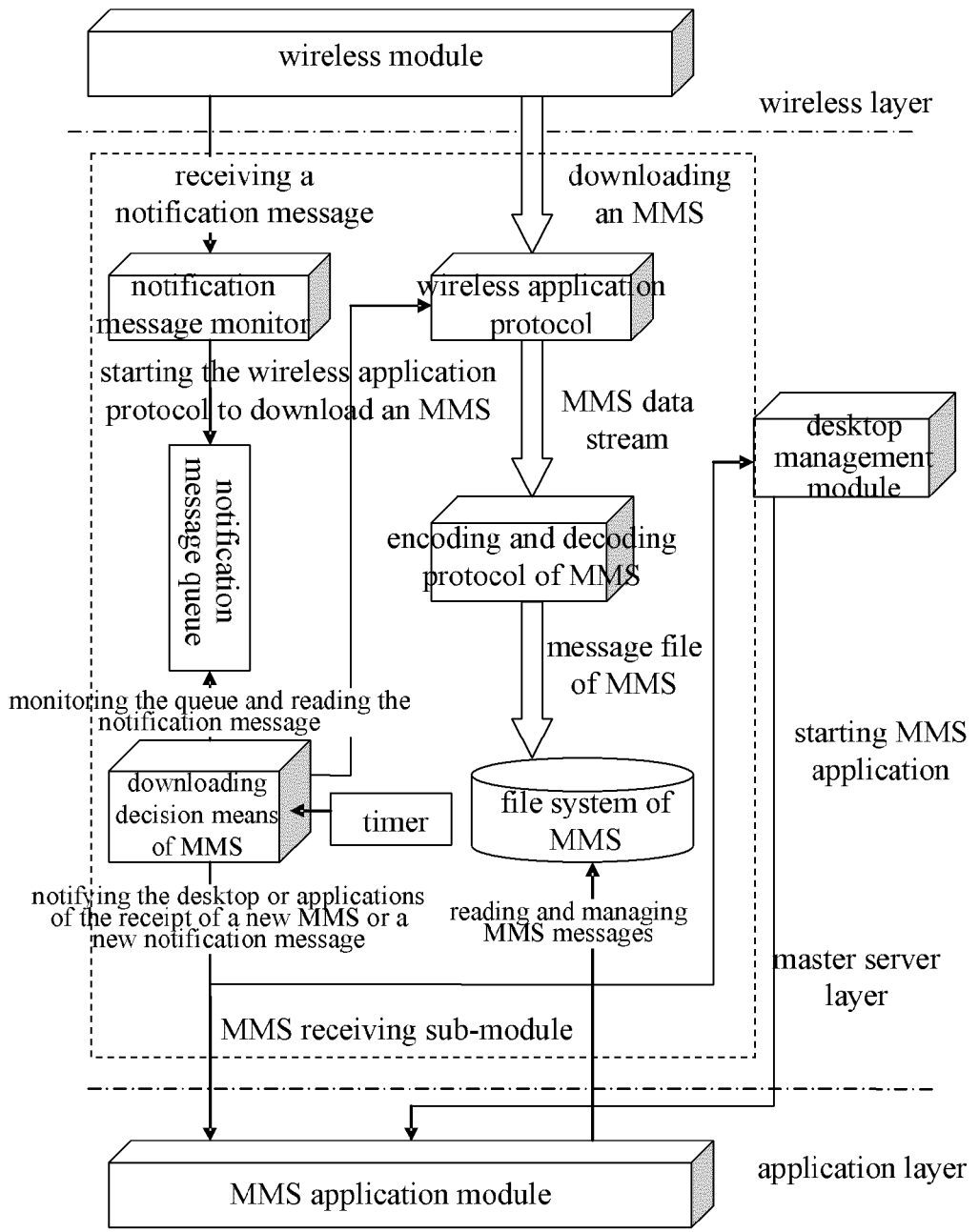
FIG. 3 is a schematic diagram of the architecture of an MMS receiving method according to an embodiment of the present invention.

One of the ways for implementing the above MMS receiving system is described in detail with reference to FIG. 3. FIG. 3 is a schematic diagram of the architecture of an MMS receiving method according to an embodiment of the present invention.

As shown in FIG. 3, in the architecture, the function structure related to the MMS service is divided into two parts: one is an MMS application module which belongs to application layers, and is mainly in charge of MMS transmission and manual downloading as well as routine management (such as view, edit, delete, and store) of MMS messages, wherein the module is loaded to the memory by starting a desktop management module, only when the user needs to use it; and the other one is an MMS receiving sub-module (corresponding to the MMS receiving module) which is bound with the main application of the system (viz. mobile terminal) to reside in the memory, and belongs to SERVER layers (starting MMS application), wherein the module mainly consists of processing units such as a notification message monitor, a notification message queue (viz. processing queue), an MMS downloading decision means, a timer, a WAP protocol, an MMS encoding and decoding protocol, an MMS file system and etc.

In the above, the notification message monitor is used for receiving a notification message, which mainly monitors PUSH messages received by a wireless module in the wireless layer. Upon finding that the PUSH message belongs to MMS notification messages, it puts the PUSH message into the notification message queue which is used for monitoring the queue and reading the notification message. The MMS downloading decision means, the core of the whole receiving sub-module, is used for notifying the desktop or applications of the receipt of a new MMS or a new notification message and downloading the MMS by starting the WAP protocol, the MMS file system used for reading and managing the MMS messages. The WAP protocol downloads the MMS from the wireless module, and transmits the MMS data stream to the MMS encoding and decoding protocol entity, which will transmit the MMS message files to the MMS file system.

Method Embodiments

Figure 4:
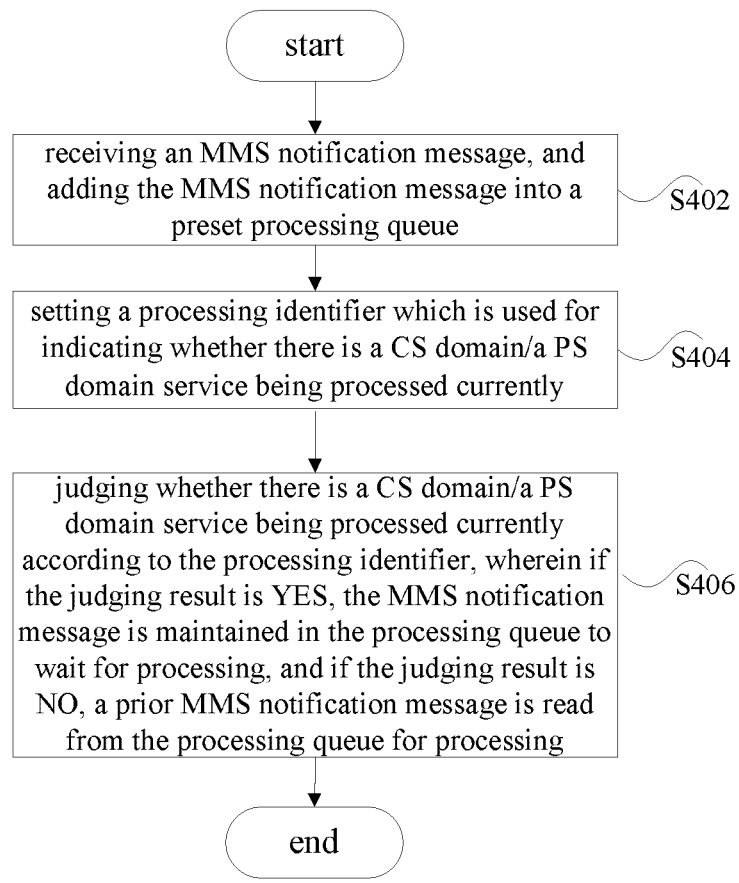
FIG. 4 is a flow chart of a method for processing an MMS notification message according to an embodiment of the present invention.

The embodiment of the present invention also provides a method for processing an MMS notification message. The method is now described with reference to the device for processing an MMS notification message provided in the above embodiment of the present invention. FIG. 4 is a flow chart of a method for processing an MMS notification message according to an embodiment of the present invention. As shown in FIG. 4, the method comprises:

step S402, receiving an MMS notification message, and adding the MMS notification message into a preset processing queue;

step S404, setting a processing identifier which is used for indicating whether there is a CS domain/a PS domain service being processed currently; preferably, setting the processing identifier in a shared memory;

step S406, judging whether there is a CS domain/a PS domain service being processed currently according to the processing identifier, wherein if the judging result is YES, the MMS notification message is maintained in the processing queue to wait for processing, and if the judging result is NO, the processing identifier is set as indicating that there is a CS domain/a PS domain service being processed currently, and a prior MMS notification message is read from the processing queue for processing.

Specifically, in the terminal system, the shared memory is used to set the processing identifier (viz. CS domain/PS domain indication). When a certain CS domain/PS domain service in the system starts, the CS domain/PS domain indication of the shared memory is set as TRUE (viz. indicating that there is a CS domain/a PS domain service being processed currently), and after the CS domain/PS domain service ends, the CS domain/PS domain indication of the shared memory is set as FALSE (viz. indicating that there is no CS domain/a PS domain service being processed currently). After the MMS notification message is received, it is firstly detected whether the CS domain/PS domain indication of the shared memory is TRUE wherein if TRUE, the MMS notification message is kept waiting in the processing queue, and is not processed until the CS domain/PS domain indication of the shared memory is FALSE. Similarly, when the MMS is being downloaded, if other CS domain/PS domain services are started, judgment is made according to the indication and the same processing is performed. In this way, the problem of service interruption or service failure caused by concurrence of terminal services is effectively settled. In the present embodiment, the practice of using a processing identifier instead of a message broadcast notification method in the conventional system serves to enhance real-time performance in processing system affairs.

Through the present embodiment, a new method used at mobile phone terminals for processing an MMS notification message is provided. The method optimizes the MMS receiving flow, can effectively settle the problem of a series of failures caused by the conventional MMS receiving methods at mobile phone terminals, especially in high end smart mobile phones in which software and service functions are relatively complicated, and thereby, can enhance the overall performance of the MMS service of the terminal and achieve favorable user experience effects.

Preferably, in the method for processing an MMS notification message according to the embodiment of the present invention, a timer mechanism can be further introduced to preset a timer for cyclically timing and manage a notification message queue (viz. processing queue). Regarding the processing of that the terminal simultaneously receives multiple notification messages and waits until other services are finished, the timer is used to monitor the processing queue, viz. in the case that the timer expires, if the processing of the previous notification message has been finished and the CS domain/PS domain indication of the shared memory is FALSE, a prior notification message is taken from the current notification message queue to start downloading of MMS. If there is no other service being processed, the next message is not processed immediately after the processing of one notification message in the current notification message queue has been finished, but it needs to start the processing after a timer presets the time. Through setting of the timer, the situations of continuous dial-up and network connection failure can be avoided, and the occurrence of false system crash in the interface of the mobile phone terminal due to large CPU (Central Processing Unit) resource occupation caused by long time downloading of MMS can also be avoided.

Based on the above, before step S406, the method further comprises: judging whether the processing queue is empty when the timer expires, wherein if the judging result is NO, it performs the operation of judging whether there is a CS domain/a PS domain service being processed currently according to the processing identifier.

Figure 5:
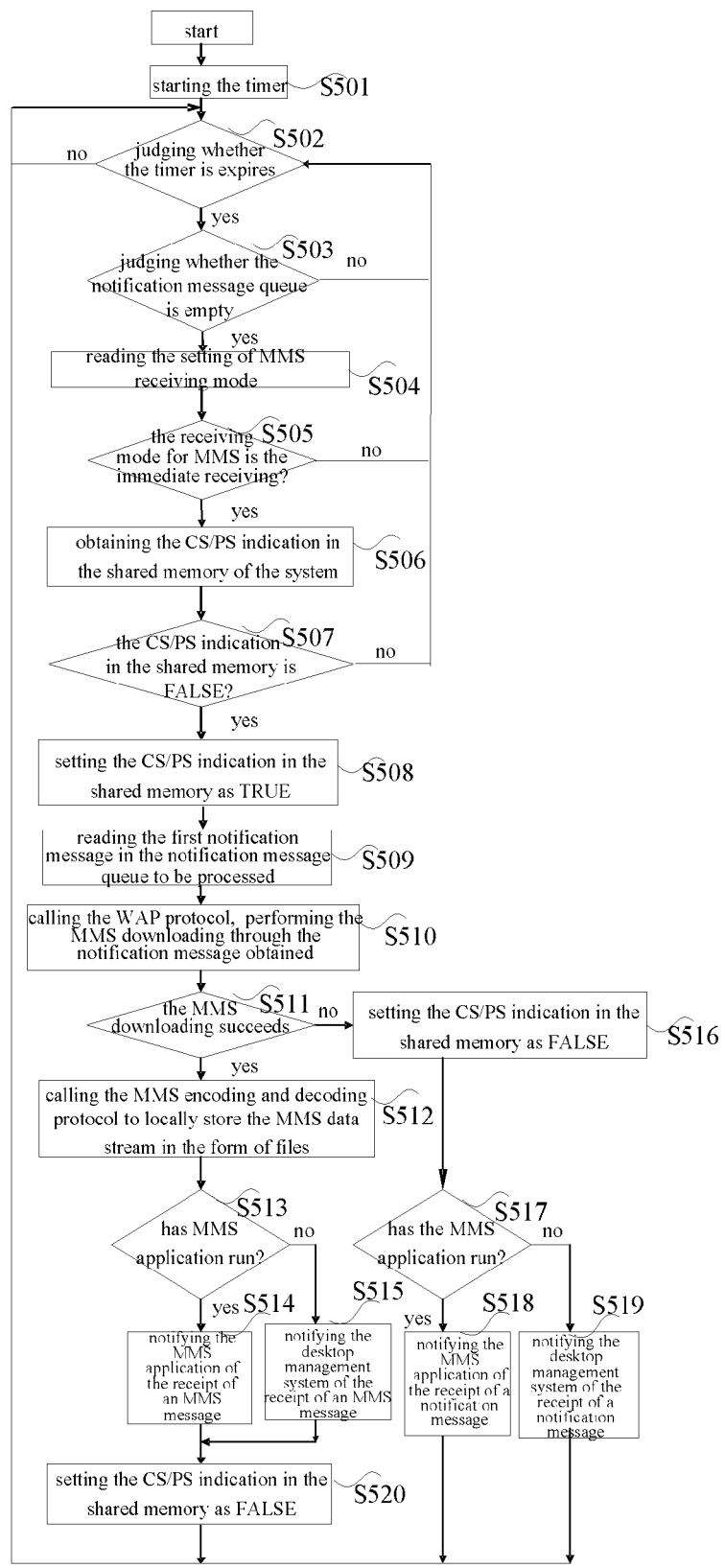
FIG. 5 is a flow chart of a processing example of an MMS downloading decision means during an MMS receiving process according to an embodiment of the present invention.

In conjunction with the timer mechanism, FIG. 5 shows a processing example of an MMS downloading decision means during the MMS receiving process according to an embodiment of the present invention. The MMS downloading decision means is the core processing unit of the whole MMS receiving module. As shown in FIG. 5, the processing of the MMS downloading decision means for the MMS receiving specifically comprises the following steps (step S501-step S520):

step S501, starting the timer, and going to step S502;

step S502, judging whether the timer expires, wherein if the judging result is YES, it goes to step S503, and if the judging result is NO, it continues performing step S502;

step S503, judging whether the notification message queue is empty, wherein if the judging result is YES, it returns to step S502, and if the judging result is NO, it goes to step S504;

step S504, reading the setting of MMS receiving mode of the mobile phone terminal, and it goes to step S505;

step S505, judging whether the receiving mode is the immediate receiving, wherein if the judging result is YES, it goes to step S506, and if the judging result is NO, it returns to step S502;

step S506, obtaining the CS/PS indication in the shared memory of the system, and going to step S507;

step S507, judging whether the CS/PS indication is FALSE, wherein if the judging result is YES, it goes to step S508, if the judging result is NO, it returns to step S502;

step S508, setting the CS/PS indication in the shared memory of the system as TRUE, and going to step S509;

step S509, reading the first notification message in the notification message queue for the purpose of being processed, and going to step S510;

step S510, calling the WAP protocol, performing the MMS downloading through the notification message obtained in step S509, and going to step S511;

step S511, judging whether the MMS downloading succeeds, where if the judging result is YES, it goes to step S512, and if the judging result is NO, it goes to step S516;

step S512, calling the MMS encoding and decoding protocol, to locally store the MMS data stream in the form of files, and going to step S513;

step S513, judging, through an interface provided by the system, whether the MMS application in the current system has run, wherein if the judging result is YES, it goes to step S514, and if the judging result is NO, it goes to step S515;

step S514, notifying the MMS application of the receipt of a new MMS message, and going to step S520;

step S515, notifying the desktop management system of SERVER of the receipt of a new MMS message, and going to step S520;

step S516, setting the CS/PS indication in the shared memory as FALSE;

step S517, judging, through an interface provided by the system, whether the MMS application in the current system has run, wherein if the judging result is YES, it goes to step S518, and if the judging result is NO, it goes to step S519;

step S518, notifying the MMS application of the receipt of a new notification message, and returning to step S502;

step S519, notifying the desktop management system of SERVER of the receipt of a new notification message, and returning to step S502;

step S520, setting the CS/PS indication in the shared memory as FALSE, and returning to step S502.

Through the embodiments of the present invention, an architecture which optimizes the MMS application is used, the shared memory is used to set the CS domain or PS domain indication so as to avoid concurrence of multiple services, and key technologies such as a notification message queue and a timer management mechanism are introduced to the MMS receiving module, which can effectively optimize MMS receiving flow, can effectively settle the problem of a series of failures caused by the conventional MMS receiving methods at mobile phone terminals, especially in high end smart mobile phones in which software and service functions are very complicated, and thereby, can enhance the overall performance of the MMS service of the terminal.

Obviously, those skilled in the art shall appreciate, all of the above modules or steps of the present invention can be realized by a universal computing device, and they can be concentrated in a single computing device or distributed in the network consisting of several computing devices. Alternatively, they can be realized by program codes executable by the computing device, such that they can be stored in a storage device to be executed by the computing device. Or each of them can be manufactured into an integrated circuit module, or several modules or steps of them can be manufactured into a single integrated circuit module. In this way, the present invention is not limited to the combination of any particular hardware and software.

The descriptions above are only preferable embodiments of the present invention, which are not used to restrict the present invention. For those skilled in the art, the present invention may have various changes and variations. Any modifications, equivalent substitutions, improvements etc. within the spirit and principle of the present invention shall all be included in the scope of protection of the present invention.

What is claimed is:

1. A method for processing a multimedia messaging service (MMS) notification message, comprising executing following steps by an optimized architecture of MMS application which is divided into two parts, a first part comprising an MMS receiving module which has relatively simple functions, occupies small system memory, and resides in a system memory together with a main application, and a second part comprising an MMS application module which has relatively complicated functions, occupies large system memory, and is usually loaded into the system memory by selecting a desktop management module of the main application of a system only when a user needs the MMS:

receiving the multimedia messaging service notification message, and adding the multimedia messaging service notification message into a preset processing queue;

setting a processing identifier which is configured for indicating whether there is a circuit switch domain or a packet switch domain service being processed currently;

judging whether there is a circuit switch domain or a packet switch domain service being processed currently according to the processing identifier, wherein if the judging result is YES, maintaining the multimedia messaging service notification message in the processing queue to wait for processing, and if the judging result is NO, reading a prior multimedia messaging service notification message from the processing queue for processing.

2. The method according to claim 1, wherein the method further comprises:

presetting a timer for cyclically timing, wherein the timer is configured to monitor the processing queue.

3. The method according to claim 2, wherein before judging whether there is a circuit switch domain or a packet switch domain service being processed currently according to the processing identifier, the method further comprises:

judging whether the processing queue is empty when the timer expires; and performing the operation of judging whether there is a circuit switch domain or a packet switch domain service being processed currently according to the processing identifier, in the case that the judging result is NO.

4. The method according to claim 1, wherein the processing identifier is set in a shared memory.

5. The method according to claim 1, wherein if the judging result is NO, the method further comprises:
setting the processing identifier as indicating that there is a circuit switch domain or a packet switch domain service being processed currently.

6. A device for processing a multimedia messaging service (MMS) notification message, the device having an optimized architecture which is divided into two parts, a first part comprising an MMS receiving module which has relatively simple functions, occupies small system memory, and resides in a system memory together with a main application, and a second part comprising an MMS application module which has relatively complicated functions, occupies large system memory, and is usually loaded into the system memory by selecting a desktop management module of the main application of a system only when the a needs the MMS, the device comprising:
a receiving sub-module, configured to receive the multimedia messaging service notification message;
a queue maintaining sub-module, configured to preset a processing queue, and add the multimedia messaging service notification message into the processing queue;
a setting sub-module, configured to set a processing identifier which is configured for indicating whether there is a circuit switch domain or a packet switch domain service being processed currently;
a first judging sub-module, configured to judge whether there is a circuit switch domain or a packet switch domain service being processed currently according to the processing identifier; and
a processing sub-module, configured to read a prior multimedia messaging service notification message from the processing queue for processing.

7. The device according to claim 6, wherein the receiving sub-module further comprises:
a timer configured to time cyclically; and
a second judging sub-module, configured to judge whether the processing queue is empty.

8. The device according to claim 7, wherein:
the second judging sub-module judges whether the processing queue is empty when the timer expires; and
in the case that the second judging sub-module has the judging result of NO, the first judging sub-module judges whether there is a circuit switch domain or a packet switch domain service being processed currently according to the processing identifier.

9. The device according to claim 6, wherein:
the setting sub-module is configured to set the processing identifier as indicating that there is a circuit switch domain or a packet switch domain service being processed currently, in the case that the first judging sub-module has the judging result of NO; and
the processing sub-module is configured to read a prior multimedia messaging service notification message from the processing queue for processing, in the case that the first judging sub-module has the judging result of NO.

10. A multimedia messaging service receiving system, comprising:
a multimedia messaging service receiving module, which is bound with a main application module of a mobile terminal, configured to implement interception of a multimedia messaging service notification message and automatic downloading of the multimedia messaging service; and
a multimedia messaging service application module, which is connected to the multimedia messaging service receiving module, the multimedia messaging service application module configured to transmit, manually download, and manage the multimedia messaging service,
wherein the multimedia messaging service receiving module comprises:
a receiving sub-module, configured to receive the multimedia messaging service notification message;
a queue maintaining sub-module, configured to preset a processing queue, and add the multimedia messaging service notification message into the processing queue;
a setting sub-module, configured to set a processing identifier which is configured for indicating whether there is a circuit switch domain or a packet switch domain service being processed currently;
a first judging sub-module, configured to judge whether there is a circuit switch domain or a packet switch domain service being processed currently according to the processing identifier; and
a processing sub-module, configured to read a prior multimedia messaging service notification message from the processing queue for processing, and notify the processing results to the multimedia messaging service application module.

* * * * *

UNITED STATES PATENT AND TRADEMARK OFFICE
CERTIFICATE OF CORRECTION

PATENT NO. : 8,780,892 B2
APPLICATION NO. : 13/056640
DATED : July 15, 2014
INVENTOR(S) : Gang Cao It is certified that error appears in the above-identified patent and that said Letters Patent is hereby corrected as shown below:

In the Specification

In column 6 at line 23, change "wherein," to --Wherein,--.

In the Claim

In column 11 at line 18, In Claim 6, change "the a" to --a user--.

Signed and Sealed this
Twenty-eighth Day of April, 2015

Michelle K. Lee
*Director of the United States Patent and Trademark Office*